US011887797B2

(12) United States Patent
Kramer et al.

(10) Patent No.: US 11,887,797 B2
(45) Date of Patent: Jan. 30, 2024

(54) ELECTRICAL SWITCHING ELEMENT COMPRISING A DIRECT ARMATURE COUPLING

(71) Applicant: TE Connectivity Germany GmbH, Bensheim (DE)

(72) Inventors: Uwe Kramer, Schulzendorf (DE); Matthias Kroeker, Mittenwalde (DE); Katrin Schertler, Dallgow-Doberitz (DE); Thomas Haehnel, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 927 days.

(21) Appl. No.: 16/803,181

(22) Filed: Feb. 27, 2020

(65) Prior Publication Data

US 2020/0194207 A1 Jun. 18, 2020

Related U.S. Application Data

(63) Continuation-in-part of application No. 15/728,022, filed on Oct. 9, 2017, now Pat. No. 10,607,799.

(30) Foreign Application Priority Data

Oct. 7, 2016 (DE) ........................ 102016219529.8

(51) Int. Cl.
*H01H 50/58* (2006.01)
*H01H 50/36* (2006.01)
(Continued)

(52) U.S. Cl.
CPC ............ *H01H 50/58* (2013.01); *H01H 50/24* (2013.01); *H01H 50/34* (2013.01); *H01H 50/36* (2013.01); *H01H 2201/026* (2013.01)

(58) Field of Classification Search
CPC ........ H01H 50/58; H01H 50/64; H01H 50/18; H01H 50/60
See application file for complete search history.

(56) References Cited

U.S. PATENT DOCUMENTS 3,790,733 A * 2/1974 Pohl ........................ H01H 1/26 200/283
4,290,037 A 9/1981 Inagawa et al.
(Continued)

FOREIGN PATENT DOCUMENTS

DE 9208114 U1 10/1992
DE 3645337 C2 8/1997
(Continued)

OTHER PUBLICATIONS

Translation for document DE9208114U1.*
(Continued)

*Primary Examiner* — Mohamad A Musleh
(74) *Attorney, Agent, or Firm* — Barley Snyder

(57) ABSTRACT

An electrical switch includes a coil assembly, an armature rotatable about an axis of rotation and driven by the coil assembly, and a contact assembly having a contact spring directly connected to the armature. The contact spring is a spring pack including a plurality of springs. At least one of the springs of the spring pack is formed of a first material and at least another one of the springs of the spring pack is formed of a second material different from the first material.

20 Claims, 7 Drawing Sheets

(51) Int. Cl.
*H01H 50/24* (2006.01)
*H01H 50/34* (2006.01)

(56) References Cited

U.S. PATENT DOCUMENTS

| | | | | |
|---|---|---|---|---|
| 4,460,881 | A | 7/1984 | Meister | |
| 4,720,909 | A * | 1/1988 | Knight | H01H 50/36 29/606 |
| 4,740,769 | A | 4/1988 | Mitschik | |
| 6,023,212 | A | 2/2000 | Mader | |
| 6,046,661 | A | 4/2000 | Reger et al. | |
| 6,426,689 | B1 | 7/2002 | Nakagawa et al. | |
| 6,661,319 | B2 | 12/2003 | Schmelz | |
| 6,788,176 | B2 | 9/2004 | Schmelz | |
| 7,659,800 | B2 * | 2/2010 | Gruner | H01H 1/26 335/185 |
| 7,710,224 | B2 | 5/2010 | Gruner et al. | |
| 9,159,515 | B2 | 10/2015 | Iwamoto et al. | |
| 9,715,985 | B2 | 7/2017 | Neuhaus et al. | |
| 9,741,518 | B2 | 8/2017 | Choi | |
| 2013/0278362 | A1 | 10/2013 | Iwamoto et al. | |

FOREIGN PATENT DOCUMENTS

| | | | | |
|---|---|---|---|---|
| DE | 19715261 | C1 | 12/1998 | |
| DE | 19724820 | A1 | 12/1998 | |
| EP | 0251034 | A1 | 1/1988 | |
| EP | 0252344 | B1 | 1/1988 | |
| EP | 3553803 | A1 * | 10/2019 | H01H 1/02 |
| GB | 2193041 | A | 1/1998 | |
| JP | S62152334 | U | 9/1987 | |
| JP | 19886324521 | A | 1/1988 | |
| JP | H03152819 | A | 6/1991 | |
| JP | 1991173029 | A | 7/1991 | |
| JP | 2013222699 | A | 10/2013 | |
| WO | WO-2015125319 | A1 * | 8/2015 | H01H 1/26 |

OTHER PUBLICATIONS

Extended European search report dated Nov. 9, 2020, in Appln. No. 20163528.1-1202/3703093, 9 pp.
Extended European Search Report, Application No. 17195537.0, dated Mar. 16, 2018, 10 pages.
Abstract for EP0884927, corresponds to DE 19724820, dated Dec. 16, 1998, 2 pages.
Abstract for JPH03152819A, dated Jun. 28, 1991, 1 page.
German Office Action, German Patent Application No. 10 2016 219 529.8, dated Nov. 11, 2019, 6 pages.
Korean Office Action, dated May 7, 2019, 5 pages.
Japanese Office Action and English Translation, Application No. 2017-194788, dated Feb. 1, 2021, 8 pages.
Japanese Notice of Reasons for Refusal and English translation, Patent App. No. 2017-194788, dated Jul. 6, 2021, 9 pages.

* cited by examiner

ELECTRICAL SWITCHING ELEMENT COMPRISING A DIRECT ARMATURE COUPLING

CROSS-REFERENCE TO RELATED APPLICATIONS

This application is a continuation-in-part of U.S. patent application Ser. No. 15/728,022, filed on Oct. 9, 2017, which claims the benefit of the filing date under 35 U.S.C. § 119(a)-(d) of German Patent Application No. 102016219529.8, filed on Oct. 7, 2016.

FIELD OF THE INVENTION

The invention relates to an electrical switch and, more particularly, to an electrical switch having an armature and a contact spring movable by the armature.

BACKGROUND

Electrical switches, such as relays, are known in the prior art. Known electrical switches have an electromagnetic drive device in the form of the coil assembly which drives an armature about an axis of rotation through an angular range having at least two switching states. The armature is also referred to as a rotating armature. For transmitting the rotational movement of the armature to a contact spring, known electrical switches have a coupler which deflects and switches the spring.

An electrical switch 1' according to the prior art is shown in a plan view 3 in FIG. 1. The electrical switch 1' is a relay 5 or switch 7 and has a coil assembly 9 which is arranged in a drive portion 11. A transmission portion 13 and a contact portion 15 are connected to the drive portion 11.

The coil assembly 9 located in the drive portion 11 has a coil 17, which is supplied with current and controlled by control and supply lines 19, and an armature 21 which is embodied as a rotational armature 23 and is rotatable about an axis of rotation 25. A yoke 22 is concealed in FIG. 1. The armature 21 has an elongated extension 32 which is elongated to form a bracket 31. The elongated extension 32 may be an elongated armature plate 27. FIG. 1 shows two armature plates 27, of which only the upper armature plate 27 is visible. A permanent magnet 29 is arranged between the armature plates 27. The extension 32 embodied as an elongated armature plate 27 has the bracket 31 which is embodied integrally with the armature plate 27 and which moves together with the armature 21 during the rotation thereof about the axis of rotation 25.

The bracket 31 is connected to a coupler 33 so as to transmit movement, in such a way that a pivoting movement 35 of the bracket 31 about the axis of rotation 25 is converted into a linear movement 37 of the coupler 33. The pivoting movement 35 comprises a first direction of rotation 35*a* and a second direction of rotation 35*b*. The coupler 33 extends from the drive portion 11 via the transmission portion 13 into the contact portion 15 and transmits the pivoting movement 35 of the bracket 31 to a contact spring 39 of the contact portion 15 in the form of the linear movement 37.

The coupler 33 is oriented substantially perpendicular to the bracket 31 and perpendicular to the contact spring 39. At respective fixing points 41, the bracket 31 and contact spring 39 are fixed to the coupler 33 so as to transmit movement. The contact spring 39 is rigidly connected to a load contact 45 at a fixing end 43, whereas a free end 47 positioned distal from the fixing end 43 is deflectable in a switching direction 49 or an opening direction 51 by the coupler 33.

The electrical switch 1' of FIG. 1 is shown in an open position 53, wherein a movable contact element 55 and a fixed contact element 57 fixed to the further load contact 45 are at a contact distance 59 from one another. The fixed and movable contact elements 55, 57 and the contact spring 39 form a contact assembly 16.

The coupler 33 embodied as a separate component in the prior art requires a brace or guide to suitably transmit the rotational movement of the armature 21 to the spring 39. This brace or guide is usually provided by a housing of the electrical switch 1'. Prior art electrical switches 1' are thus large and cannot be constructed in a space-saving manner.

SUMMARY

An electrical switch includes a coil assembly, an armature rotatable about an axis of rotation and driven by the coil assembly, and a contact assembly having a contact spring directly connected to the armature. The contact spring is a spring pack including a plurality of springs. At least one of the springs of the spring pack is formed of a first material and at least another one of the springs of the spring pack is formed of a second material different from the first material.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
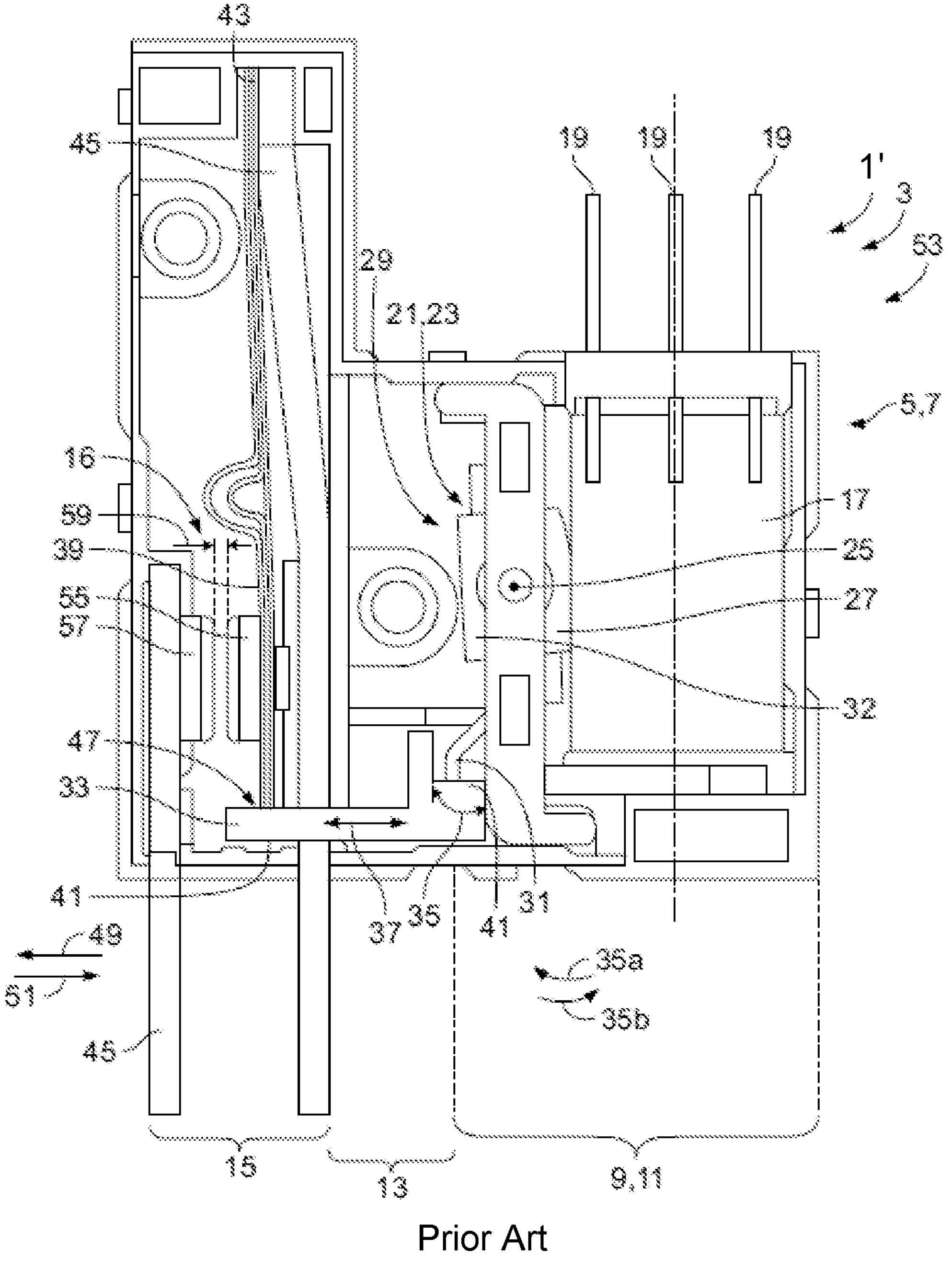
Prior Art Fig. 1
FIG. 1 is a plan view of an electrical switch according to the prior art.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

An electrical switch 1 according to an embodiment of the invention is shown in FIGS. 2-4 and 8-10. The electrical switch 1 is shown in an open position 53 in FIGS. 2-4 and a closed position 61 in FIGS. 8-10.

Figure 2:
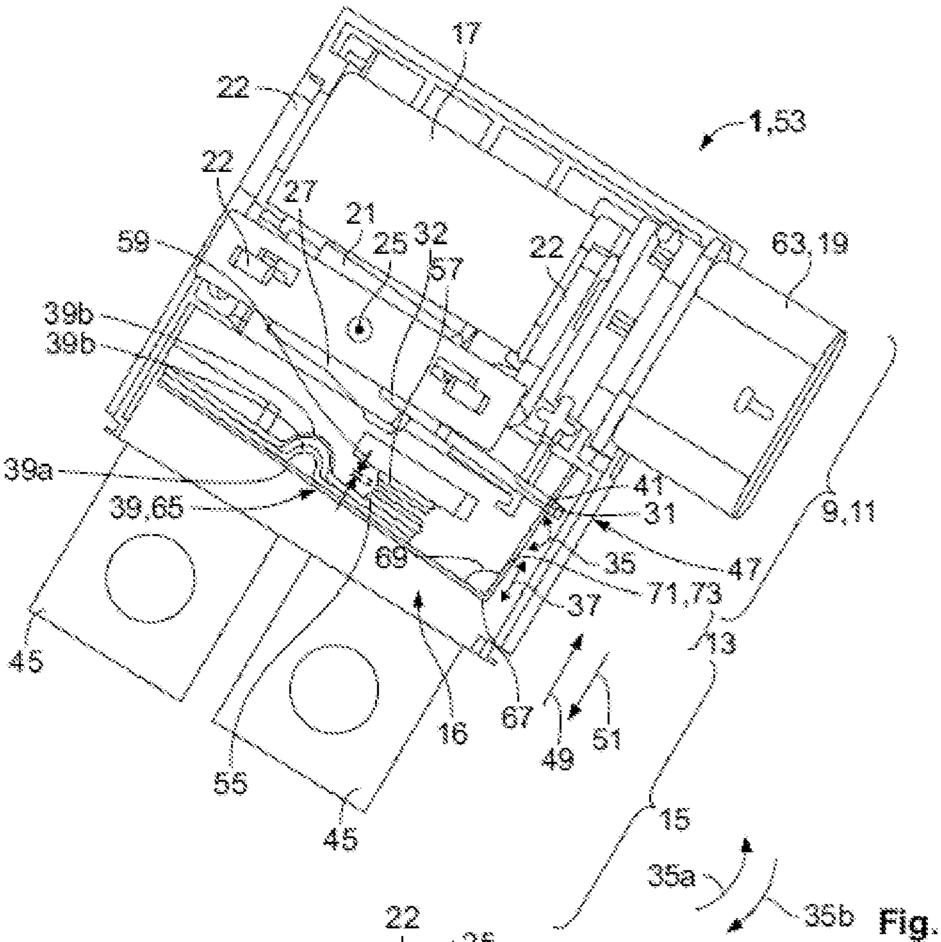
FIG. 2 is a plan view of an electrical switch according to an embodiment of the invention in an open position.
Figure 3:
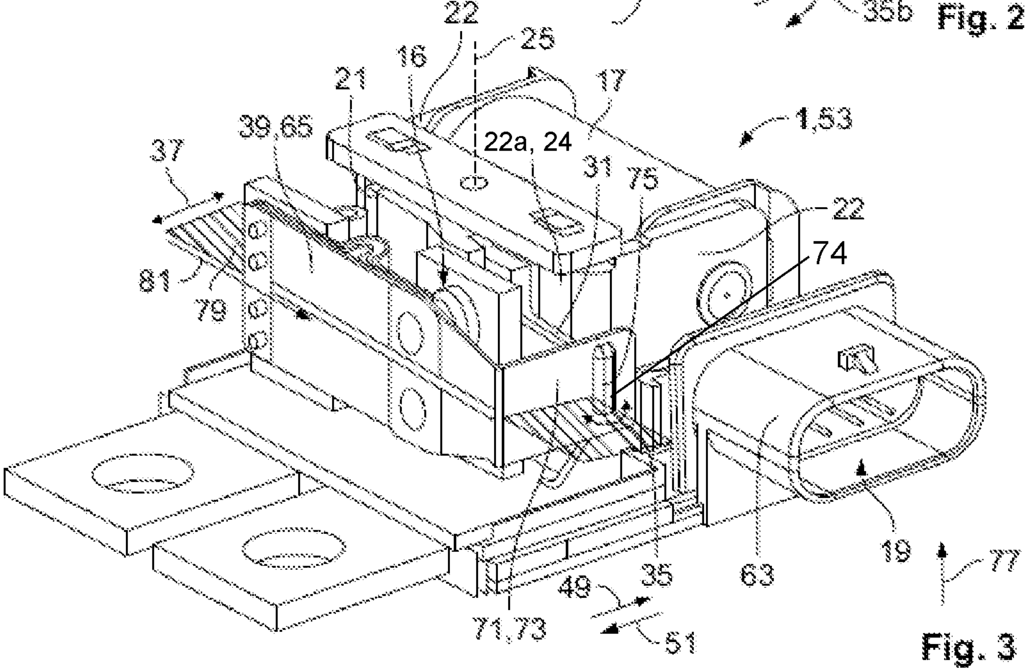
FIG. 3 is a perspective view of the electrical switch of FIG. 2.

The electrical switch 1, as shown in FIGS. 2 and 3, comprises a drive portion 11 having a coil assembly 9, a transmission portion 13, and a contact portion 15. The coil 17 is supplied and actuated via control and supply lines 19 received in a connecting plug 63. An armature 21 of the electrical switch 1 has an extension 32 elongated to form a bracket 31. The bracket 31 performs the pivoting movement 35, shown in FIGS. 2, 3, and 9, about the axis of rotation 25 together with the armature 21.

The armature 21 is enclosed in portions by the yoke 22. A pole face 22*a* of the yoke 22 is shown in FIG. 3. Separator plates 24 for attenuating the magnet system can be disposed on the pole face 22*a* to embody a monostable electrical switch 1. The separator plates 24, in an embodiment, act as a gap in an unstable switching position, weakening a magnetic force of the coil 17 and making it possible to reset the switch 1 using a spring force of a spring pack 65. A stable switching position is maintained using the spring force of the spring pack 65 and the unstable switching position is switched from the stable switching position and maintained using the electromagnetic force of the coil 17. In other embodiments, the electrical switch 1 may be bistable.

The electrical switch 1 also has a contact spring 39 embodied as the spring pack 65. In the embodiment shown in FIGS. 2-4, the spring pack 65 has an overstroke spring 39*a* and two partial springs 39*b*. The contact spring 39 is oriented substantially parallel to the bracket 31. The contact spring 39 deflected within the operation as described herein and bent should be considered to be parallel to the bracket, this being described by the term "substantially." The switching direction 49 and opening direction 51 in the electrical switch 1 according to the invention are oriented counter to those of the prior art electrical switch 1' of FIG. 1. The first direction of rotation 35*a* leads to a movement of the contact spring 19 in the switching direction 49 and the second direction of rotation 35*b* leads to a movement in the opening direction 51.

The overstroke spring 39*a* of the electrical switch 1 according to the invention comprises a bending point 67, as shown in FIG. 2, at which the contact spring 39 is bent at an angle 69 of substantially 90°, an elongation 71 of the overstroke spring 39*a* forming a limb 73 which protrudes from the contact spring 39 at the angle 69. The limb 73 is hooked into the bracket 31 at the fixing point 41 in such a way that the pivoting movement 35 of the bracket 31 is transmitted into the linear movement 37 of the limb 73, which deflects the contact spring 39 via the bending point 67. An end of the overstroke spring 39*a* has an opening 74 into which the bracket 31 of the armature 21 is inserted. The electrical switch 1 has no coupler 33 as in the prior art electrical switch 1', and so a guide of the coupler 33 and the coupler 33 itself can be omitted. This reduces the accumulated tolerances of the electrical switch 1. In an embodiment in which the electrical switch 1 is monostable, a stable switching position is maintained using only the spring force of the overstroke spring 39*a* of the spring pack 65.

In an embodiment, at least one of the springs 39*a*, 39*b* of the spring pack 65 is formed of a first material and another one of the springs 39*a*, 39*b* is formed of a second material different from the first material. The first material has a higher electrical conductivity than the second material. In an embodiment, the first material is a copper alloy. The second material has a higher resilience than the first material. In an embodiment, the second material is a spring steel. In a further embodiment, the second material is a chromium-nickel alloy spring steel, such as an X10 spring steel. In an embodiment, the partial springs 39*b* are formed of the first material and the overstroke spring 39*a* is formed of the second material.

A movable contact element 55 and a fixed contact element 57 of the electrical switch 1 are spaced apart by the contact distance 59 in the open position 53, in such a way that the load contacts 45 are not electrically interconnected.

Figure 4:
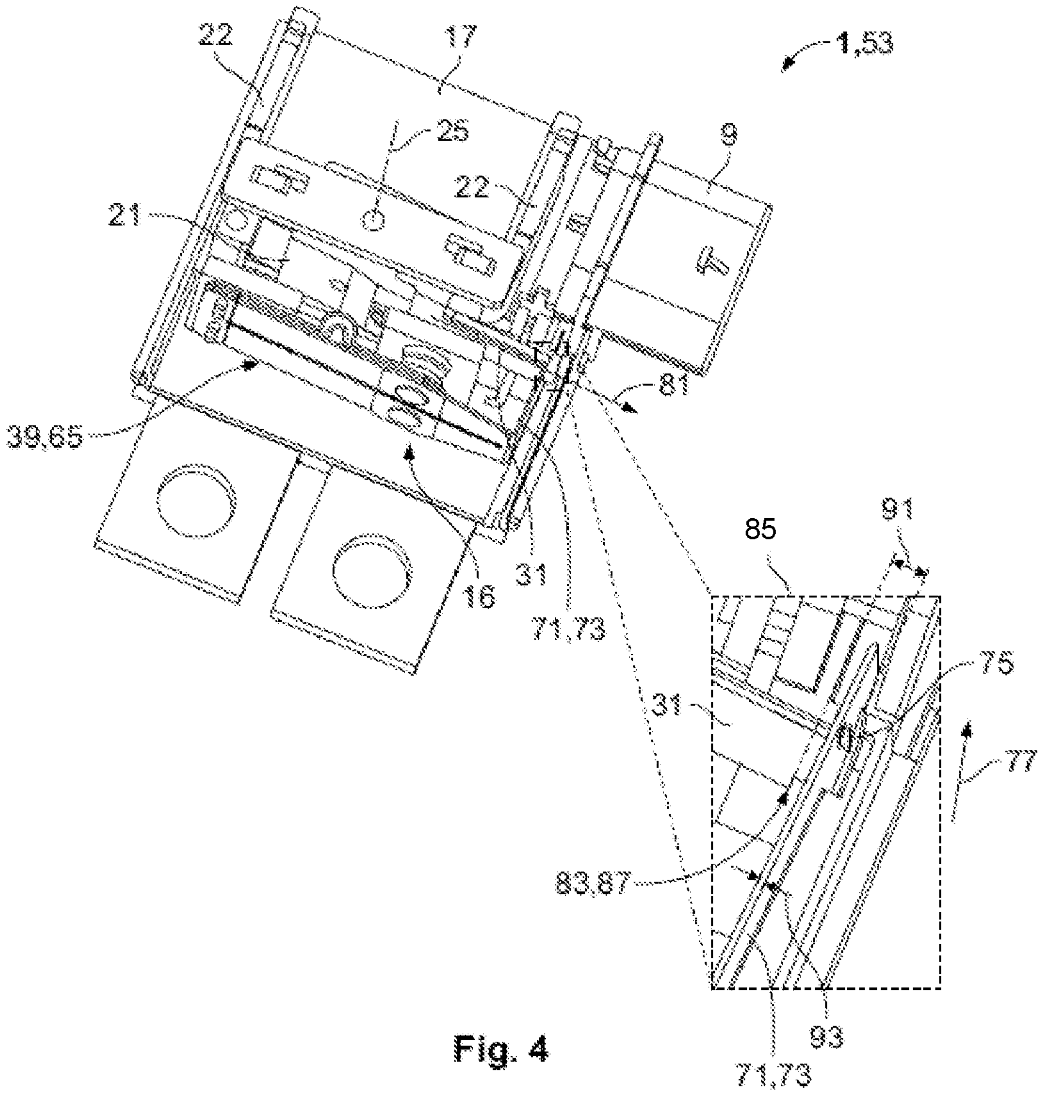
FIG. 4 is another perspective view and a detailed view of the electrical switch of FIG. 2.

The electrical switch 1 has a first stop 75 disposed on an end of the bracket 31 distal from the armature 21 and extends away from the bracket 31 in a vertical direction 77 perpendicular to the switching direction 49 and the opening direction 51, as shown in FIGS. 3 and 4. The first stop 75 is oriented perpendicular to a plane 79 which is spanned by the switching direction 49 and a longitudinal extent 81 of the contact spring 39 or the bracket 31 and which contains the pivoting movement 35. The first stop 75 of the electrical switch 1 is an integral tab 89 in the embodiments of FIGS. 2-10.

The embodiment of the electrical switch 1 shown in FIGS. 2-4 and 8-10 has a second stop 83, which can be seen clearly in an enlargement 85 of FIG. 4. The second stop 83 shown in the enlargement 85 is embodied as a step 87, which enlarges the bracket 31 transverse to the longitudinal extent 81 thereof. Between the first stop 75 and the second stop 83 there is a distance 91, which is larger than a thickness 93 of the limb 73 or the contact spring 39. In an embodiment, the distance 91 is between two and ten times the thickness 93 of the limb 73.

Figure 8:
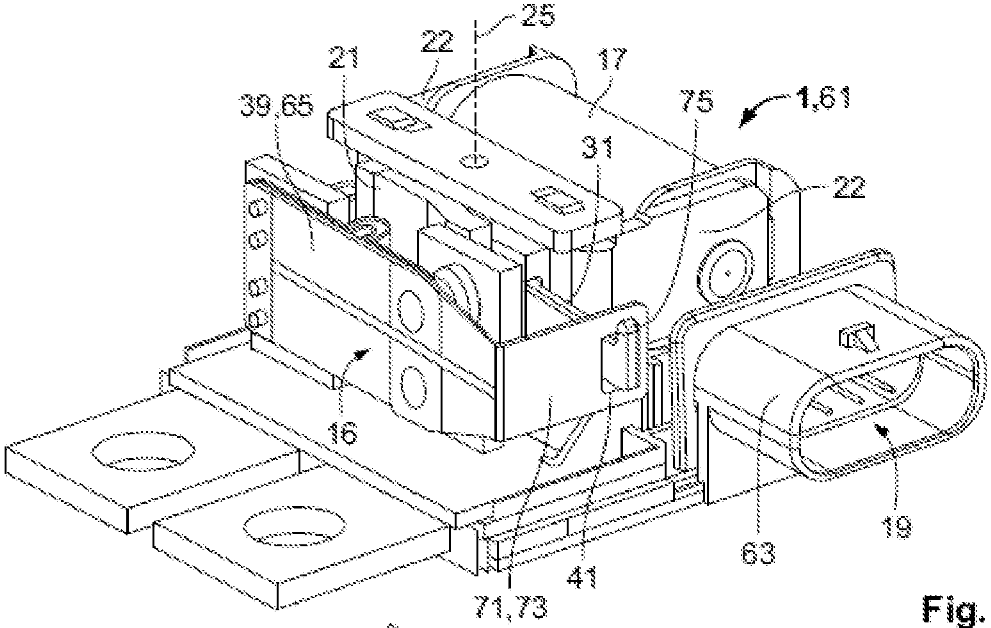
FIG. 8 is a perspective view of the electrical switch of FIG. 2 in a closed position.
Figure 9:
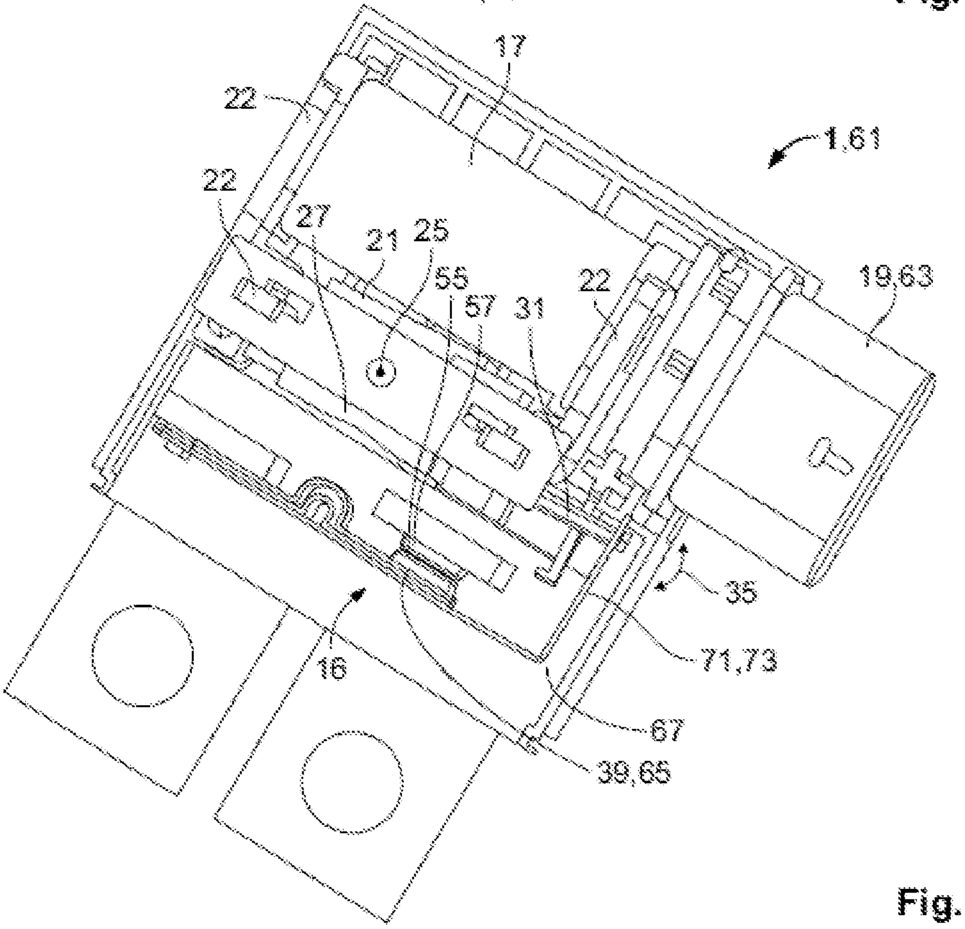
FIG. 9 is a plan view of the electrical switch of FIG. 8.
Figure 10:
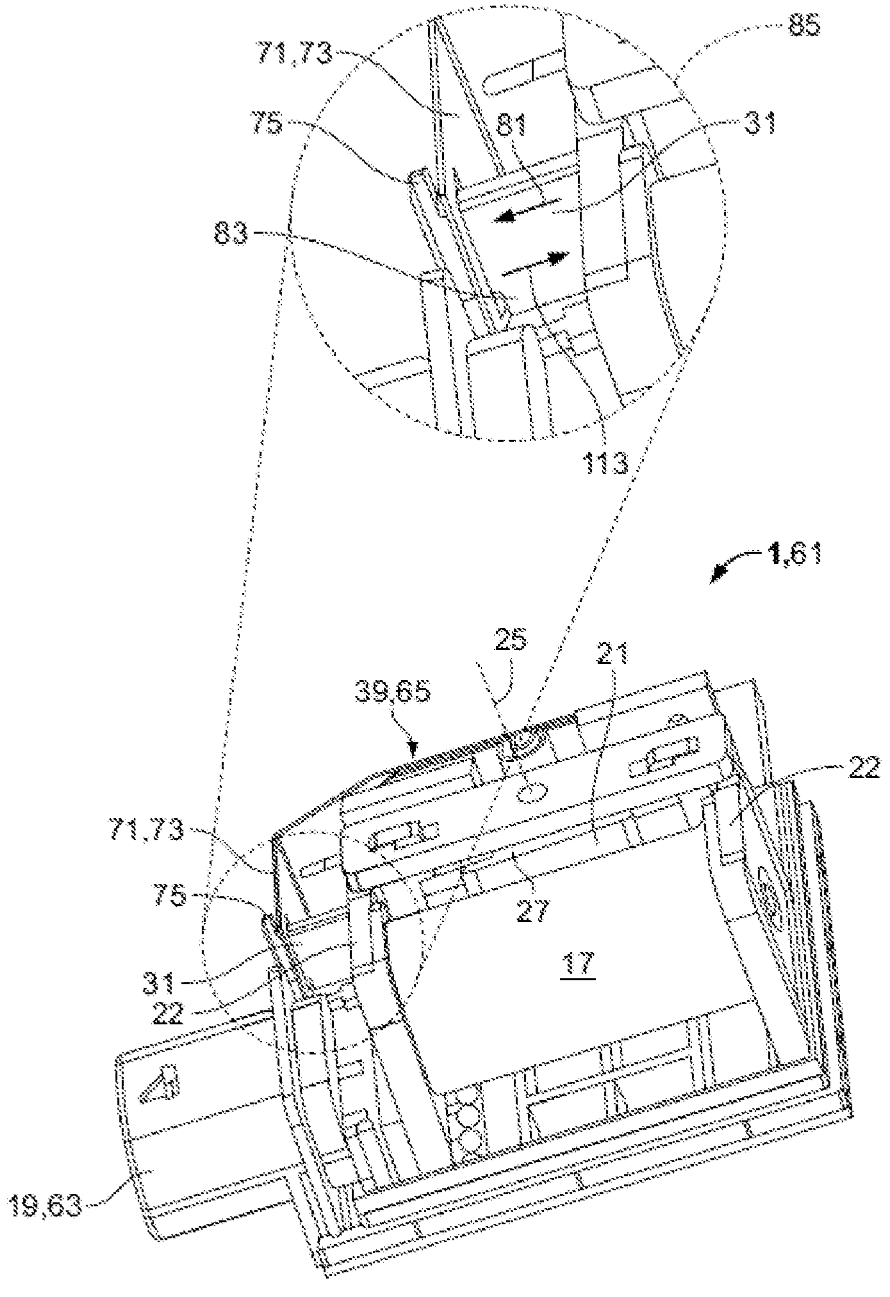
FIG. 10 is another perspective view of the electrical switch of FIG. 8.

The electrical switch 1 is shown in the closed position 61 in FIGS. 8-10. In the closed position 61, the movable contact element 55 and the fixed contact element 57 abut one another and are electrically interconnected. The first material of the partial springs 39*b* that has the higher electrical conductivity carries a current conducted between the contact elements 55, 57. The second material of the overstroke spring 39*a* that has the higher resilience better withstands high contact forces between the contact elements 55, 57 over time and through temperature variations.

The limb 73 of the electrical switch 1 in the closed position 61, as shown in FIGS. 8-10, is positioned on the second stop 83, and thus cannot slip further in the direction of the armature 21, as shown in the enlargement 85 of FIG. 10. However, the fact that the limb 73 is blocked in the direction of the armature 21 results in a transverse force 113 being transmitted, which acts on the bracket 31 from the limb 73 counter to the longitudinal extent 81 of the bracket. Said force can be transmitted to the axis of rotation 25 via the bracket 31 and the armature plate 27.

Figure 5:
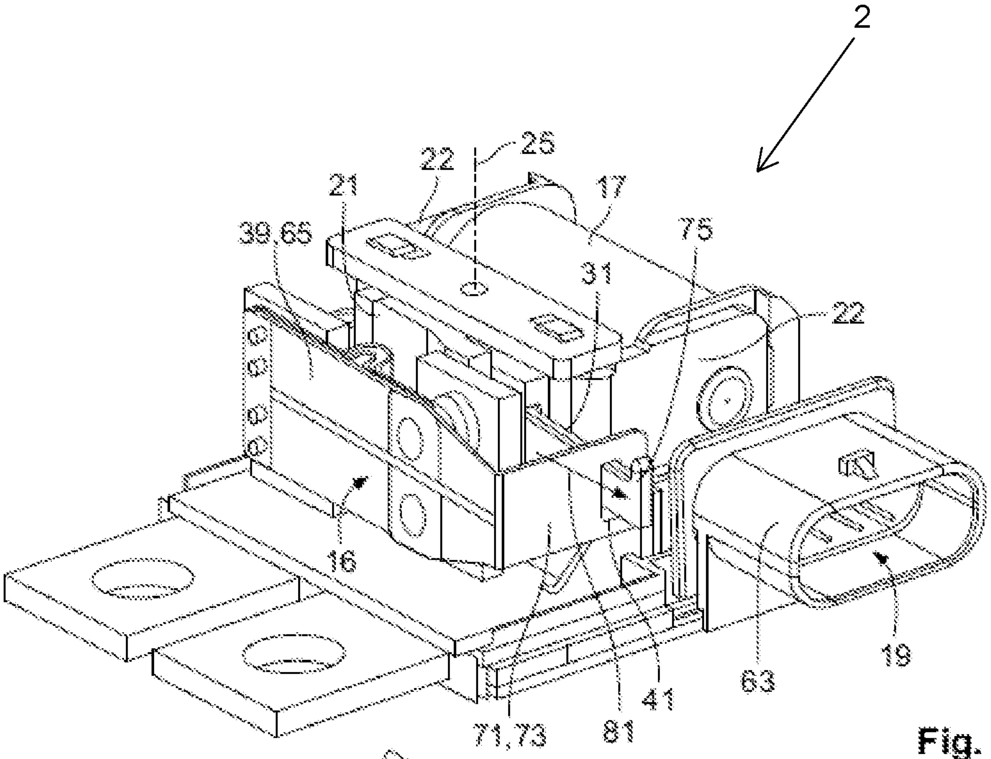
FIG. 5 is a perspective view of an electrical switch according to another embodiment of the invention.
Figure 6:
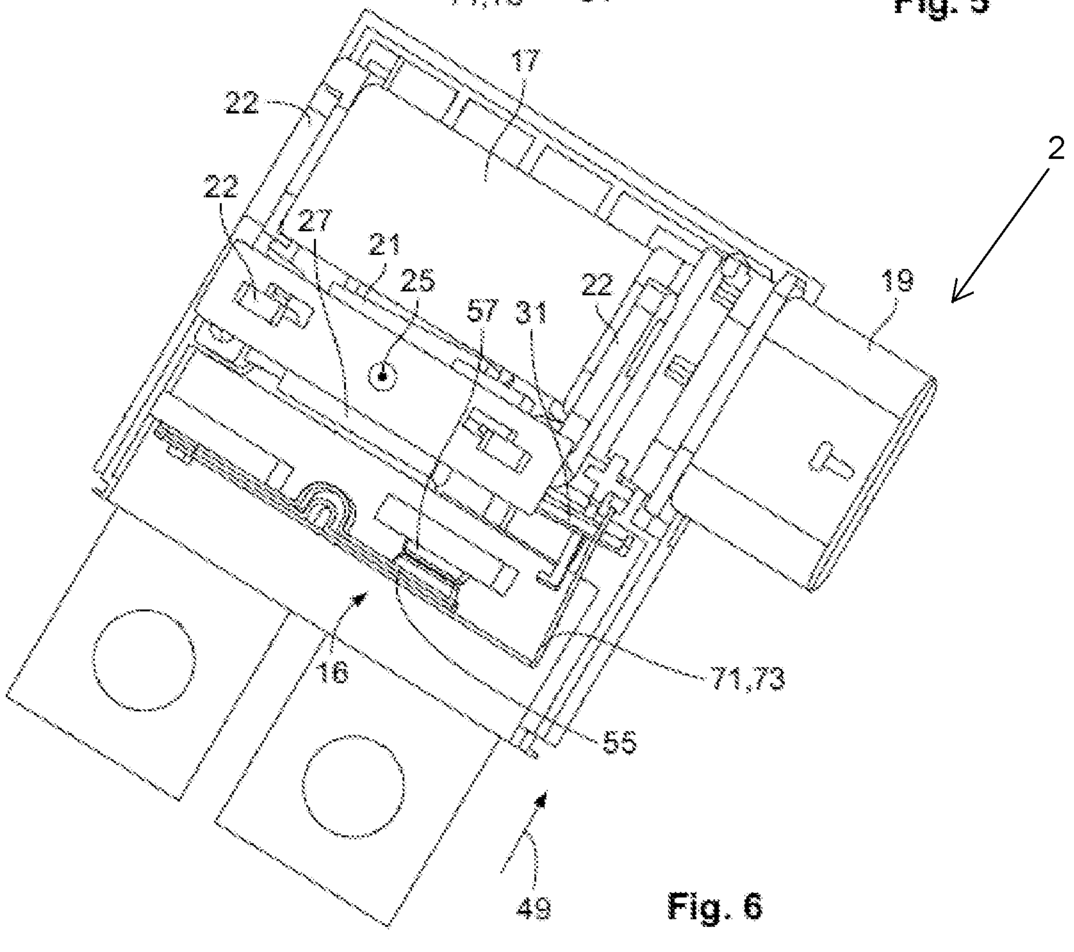
FIG. 6 is a plan view of the electrical switch of FIG. 5.
Figure 7:
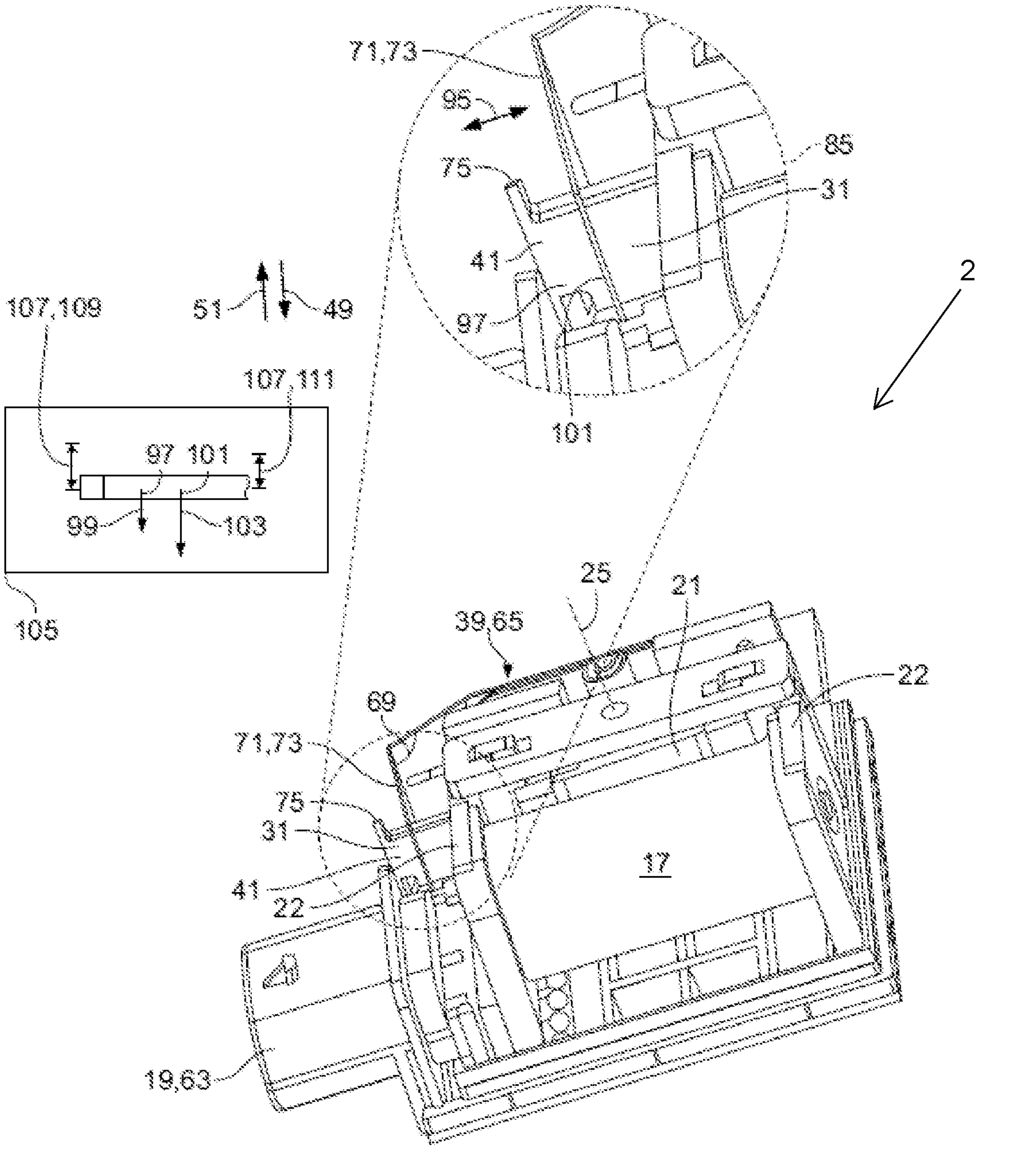
FIG. 7 is another perspective view and a detailed view of the electrical switch of FIG. 5.

An electrical switch 2 according to another embodiment of the invention is shown in FIGS. 5-7 in the closed position 61. Like reference numbers indicate like elements and only the differences with respect to the electrical switch 1 of the embodiment shown in FIGS. 2-4 and 8-10 will be described in detail.

In the electrical switch 2, as shown in FIGS. 5-7, the bracket 31 of the armature 21 has the first stop 75 but does not have the second stop 83. In the open position 53, a movement of the limb 73 can be limited in the longitudinal direction 81 of the bracket 31, but in the event of the armature 21 or the contact spring 39 being activated in the switching direction 49, the limb 73 can slide along the bracket 31 about the fixing point 41 by a play 95 shown in FIG. 7.

A provided action point 97 of a provided force 99 exerted on the limb 73 by the armature 21 via the bracket 31 is displaced to an actual action point 101 in such a way that the provided force 99 is less than an actual force 103 which acts on the limb 73, as shown in the diagram 105 of FIG. 7. The change in a deflection distance 107, by which the bracket 31 is deflectable in the switching direction 49 or opening direction 51 by way of the associated action point 97, 101, behaves inversely to the change in the force 99, 103. At the provided action point 97, a first deflection distance 109 is achieved, while at the actual action point 101, a smaller second deflection distance 111 is achieved. The limb 73 slipping counter to the longitudinal extent 81 of the bracket 31 causes the limb 73 to assume an angle 69 of less than 90° to the contact spring 39.

What is claimed is:

1. An electrical switch, comprising:
a coil assembly;
an armature rotatable about an axis of rotation and driven by the coil assembly; and
a contact assembly having a contact spring directly connected to the armature, the contact spring is a spring pack including a plurality of springs, at least one of the springs of the spring pack is formed of a first material and at least another one of the springs of the spring pack is formed of a second material different from the first material.

2. The electrical switch of claim 1, wherein the spring pack includes an overstroke spring and a pair of partial springs, the overstroke spring is directly connected to the armature.

3. The electrical switch of claim 2, wherein the partial springs are formed of the first material having a higher electrical conductivity than the second material.

4. The electrical switch of claim 3, wherein the first material is a copper alloy.

5. The electrical switch of claim 3, wherein the overstroke spring is formed of the second material having a higher resilience than the first material.

6. The electrical switch of claim 5, wherein the second material is a spring steel.

7. The electrical switch of claim 6, wherein the second material is a chromium-nickel alloy spring steel.

8. The electrical switch of claim 2, wherein the armature has an extension elongated to form a bracket connected to the overstroke spring.

9. The electrical switch of claim 8, wherein the bracket is oriented substantially parallel to the partial springs.

10. The electrical switch of claim 8, wherein the bracket is inserted into an opening of the overstroke spring.

11. The electrical switch of claim 2, wherein the overstroke spring has a protruding limb connected to the armature.

12. The electrical switch of claim 11, wherein the limb extends from the overstroke spring at a right angle.

13. A monostable electrical switch, comprising:
a coil assembly;
an armature rotatable about an axis of rotation and driven by the coil assembly;
a contact assembly having a contact spring directly connected to the armature; and
a yoke having a pole face facing the contact spring and a separator plate disposed directly on the pole face.

14. The monostable electrical switch of claim 13, wherein the separator plate acts as a gap in an unstable switching position.

15. The monostable electrical switch of claim 14, wherein the contact assembly is switched from a stable switching position to the unstable switching position by a force of the coil assembly.

16. The monostable electrical switch of claim 15, wherein the contact spring is a spring pack including a plurality of springs.

17. The monostable electrical switch of claim 16, wherein the spring pack maintains the contact assembly in the stable switching position.

18. The monostable electrical switch of claim 16, wherein the spring pack includes an overstroke spring and a pair of partial springs, the overstroke spring is directly connected to the armature.

19. The monostable electrical switch of claim 18, wherein the overstroke spring maintains the contact assembly in the stable switching position.

20. The monostable electrical switch of claim 13, wherein the yoke encloses portions of the armature.

* * * * *